US011236754B2

(12) United States Patent
Gao

(10) Patent No.: US 11,236,754 B2
(45) Date of Patent: Feb. 1, 2022

(54) UNIVERSAL FAN SYSTEM AND CONFIGURATION METHOD

(71) Applicant: Baidu USA LLC, Sunnyvale, CA (US)

(72) Inventor: Tianyi Gao, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 114 days.

(21) Appl. No.: 16/806,793

(22) Filed: Mar. 2, 2020

(65) Prior Publication Data

US 2021/0270278 A1    Sep. 2, 2021

(51) Int. Cl.
    *F04D 27/00*   (2006.01)
    *F04D 29/58*   (2006.01)
    *F04D 29/40*   (2006.01)

(52) U.S. Cl.
    CPC ......... *F04D 27/005* (2013.01); *F04D 27/004* (2013.01); *F04D 29/403* (2013.01); *F04D 29/58* (2013.01)

(58) Field of Classification Search
    CPC ...... F04D 29/58; F04D 29/403; F04D 27/005; F04D 25/166; H05K 7/20745; H05K 7/20754; H05K 7/20736
    See application file for complete search history.

(56) References Cited

U.S. PATENT DOCUMENTS

| 10,624,241 | B1* | 4/2020 | Ross | H05K 7/20181 |
| 2012/0327599 | A1* | 12/2012 | Dickinson | H05K 7/20572 |
| | | | | 361/695 |
| 2015/0181769 | A1* | 6/2015 | Oki | H05K 7/20827 |
| | | | | 165/121 |
| 2017/0097003 | A1* | 4/2017 | Chen | G06F 1/206 |
| 2018/0168071 | A1* | 6/2018 | Edge | H05K 7/20145 |
| 2021/0105910 | A1* | 4/2021 | McCarthy | H05K 7/20154 |

* cited by examiner

*Primary Examiner* — Richard A Edgar
*Assistant Examiner* — Jackson N Gillenwaters
(74) *Attorney, Agent, or Firm* — Womble Bond Dickinson (US) LLP

(57) ABSTRACT

Embodiments are disclosed of a fan module. The fan module includes a module housing having a module inlet and a module outlet. A fan compartment matrix is positioned within the housing to move air between the module inlet and the module outlet. The fan compartment matrix includes an M×N matrix of fan compartments, each fan compartment having an upstream side and a downstream side. A longitudinal air channel positioned between each pair of fan columns and a transverse air channel positioned between each pair of fan rows, the transverse air channel being fluidly coupled to the fan compartments between which it is positioned. A control chamber is positioned at each confluence of the at least one longitudinal air channel and the transverse air channel, the control chamber including one or more valves to control airflow between the longitudinal air channel and the transverse air channel. A fan is positioned in each fan compartment.

18 Claims, 6 Drawing Sheets

UNIVERSAL FAN SYSTEM AND CONFIGURATION METHOD

TECHNICAL FIELD

The disclosed embodiments relate generally to cooling of electronic equipment and in particular, but not exclusively, to a universal fan system and configuration method for cooling electronic equipment.

BACKGROUND

Modern electronic equipment typically comes packaged together with its own corresponding cooling equipment. In a server or other IT equipment, for instance, the electronic components are all in a housing and the cooling equipment, such as fans and other cooling components, are at one end of the housing. The cooling equipment is often very highly customized and highly specific to the particular physical arrangement of electronic components within the housing, meaning that these cooling systems can only satisfy the cooling requirements, and can only be optimized, for the specific hardware for which they were designed. In these highly specific cooling systems, the cooling design must be very tightly interwoven with the design of its corresponding electronic equipment. Even a minor change of electronic components within the housing, or a change of the components' positions within the housing, can require an extensive redesign of the cooling system to provide adequate cooling. That explains, at least in part, why it is common that different types of servers are implemented with different types of air cooling designs.

The extensive cooling design and redesign effort is less problematic in applications such as equipment designed for a data center, which has a very large number of identical systems such as servers, because with the large number of systems the cost of an extensive design effort can be spread over many units. But in more customizable systems, or systems made in small numbers or with unique functions, the extensive effort required results in lack of flexibility, R&D effort and cost, minimum room for optimization, and so on.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described of an apparatus and system for a universal fan module and a method of configuring the module for cooling electronic equipment. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

The disclosed embodiments provide a fan system design and configuration method for electronics packages, including edge computing servers, edge computing packages, and cloud servers. The described embodiments of a universal fan system design can be used for many different hardware systems. With the disclosed universal fan system design, additional R&D effort for thermal system design for new hardware can be significantly decreased. This improves product development efficiency and cost. The described embodiments disclose a flexible design in which the cooling solution is fully separated from the hardware it cools. The solution not only enables separation of the cooling hardware from the electronics, it also enables separation of the electronic system from its cooling system, significantly improving design efficiency. The described embodiments of a fan system can adapt easily to different design factors and scenarios; non-uniform-temperature requirement and scenarios; non-uniform-system resistance scenarios; and cooling system redundancy, system service availability, and manageability.

Figure 1A:
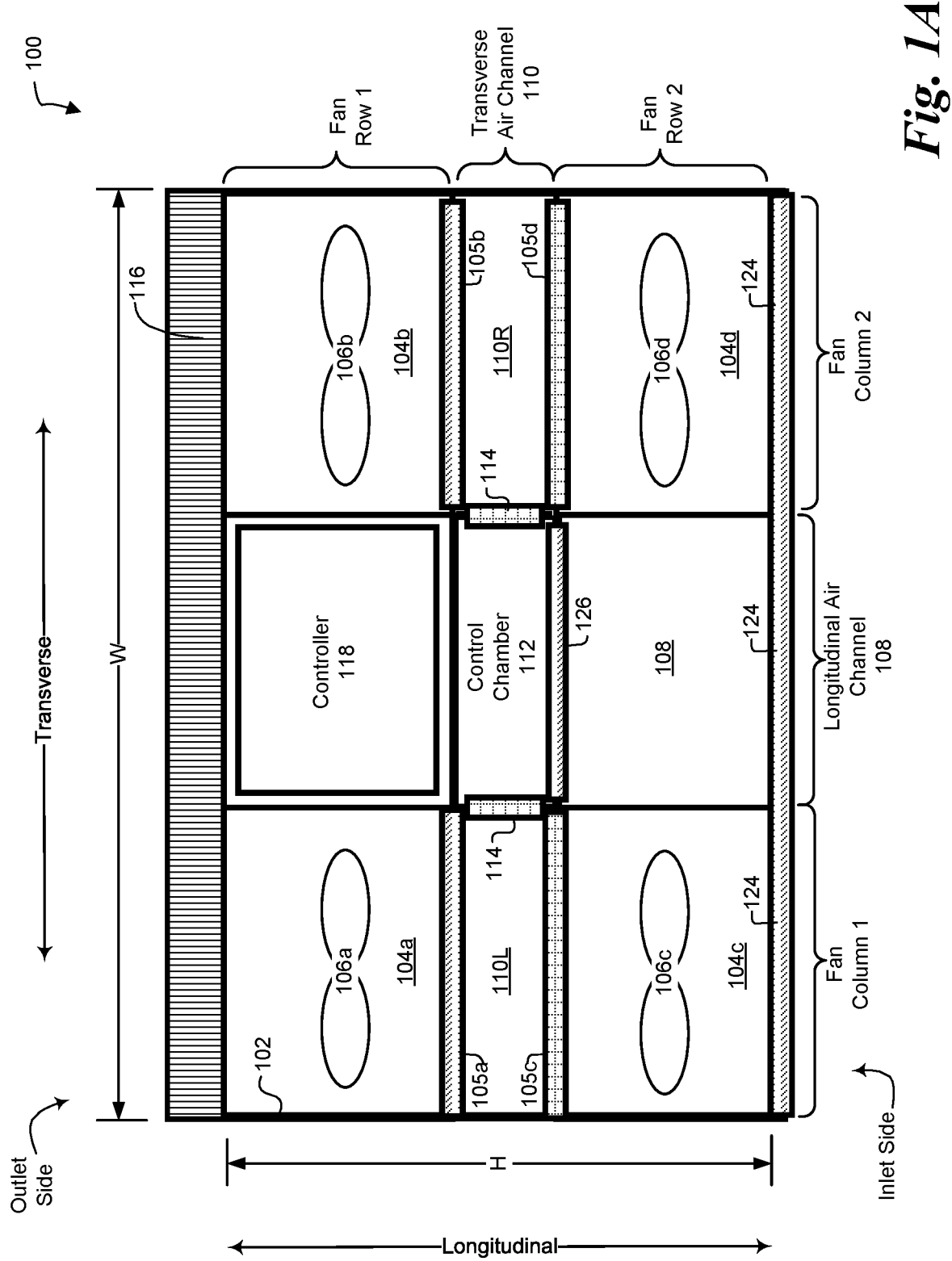
FIG. 1A is a cross-sectional view of an embodiment of a fan module.

FIG. 1 illustrates an embodiment of a fan module 100. Fan module 100 includes a housing 102 having an inlet side, an outlet side, a dimension H along a longitudinal direction, and a dimension W along a transverse dimension. Air flows through fan module 100 from the inlet side to the outlet side, such that the outlet side is downstream of the inlet side and, accordingly, the inlet side is upstream of the outlet side.

An M×N matrix of fan compartments 104 is positioned within housing 102, with M being the number of fan rows and N being the number of fan columns. In the illustrated embodiment M=N=2, so that there are four fan compartments 104a-104d arranged in two fan rows and two fan columns: compartments 104a and 104b form a first fan row and compartments 104c and 104d form a second fan row, while compartments 104a and 104c form a first fan column and compartments 104b and 104d form a second fan column. In embodiments with greater or smaller values of M and N, the number of fan compartments 104 in the matrix can differ from the number shown. In the illustrated embodiment the number of rows and the number of columns are equal (i.e., M=N), but in other embodiment there need not be equal numbers of rows and columns (i.e., M≠N, which can mean M<N or M>N in different embodiments).

A longitudinal (i.e., longitudinally-running) air channel 108 is positioned between each pair of fan columns and extends from the inlet side of housing 102 toward the outlet side of housing 102 for at least part of the longitudinal dimension H of the housing. In the illustrated embodiment longitudinal air channel 108 is fluidly coupled to the inlet side and extends from the inlet side to approximately the downstream extent of the first fan row. As used herein, the term "fluidly coupled" means coupled in such a way that fluid can be exchanged directly or indirectly. Thus, if two elements are fluidly coupled then fluid can be exchanged in either direction between them, directly or indirectly (i.e., through another element interposed between them). A transverse (i.e., transversely-running) air channel 110 is positioned between each pair of fan rows and extends across the entire transverse dimension W of housing 102. In the illustrated embodiment with M=N=2, there is one longitudinal air channel and one transverse air channel. But embodiments with other values of M and N the number of longitudinal and transverse air channels can be different than shown and the number of longitudinal air channels need not be the same as the number of transverse air channels.

A control chamber 112 is positioned at the confluence of each longitudinal air channel 108 and transverse air channel 110—i.e., there is a control chamber 112 where each longitudinal channel 108 meets each transverse channel 110. Control chamber 112 is fluidly coupled to both the longitudinal and transverse air channels and controls the airflow between longitudinal and transverse air channels. The illustrated embodiment has only one longitudinal air channel 108 and one transverse air channel 110, so that there is only one control chamber 112. But other embodiments with a different number of longitudinal and transverse air channels would have a different number of control chambers.

Control chamber 112 includes a valve 126 that opens and closes to allow or block air from flowing into the control chamber from the part of longitudinal air channel 108 upstream (i.e., closer to the inlet side) of the control chamber, but other embodiments can omit valve 126. Control chamber 112 also includes a pair of valves 114 that can open and close to allow or prevent air from flowing from control chamber 112 into one or both branches 110L and 110R of transverse air channel 110. In one embodiment valves 114 and 126 can be movable louvers that can open to allow airflow or close to prevent airflow, but in other embodiments they can be other types of valves such as movable flaps. In an embodiment where controller 118 is positioned differently than shown, so that there is a part of longitudinal air channel 108 downstream from the control chamber (i.e., between control chamber 112 and the outlet side), the control chamber can include an additional air valve 126 to allow or block air from flowing into the downstream part of longitudinal air channel 108.

Each fan compartment 104 has a corresponding fan 106 positioned in it: fan compartment 104a has fan 106a, fan compartment 104b has fan 106b, and so on. In one embodiment all fans 106 are identical, but in other embodiment they need not be. Fan compartments 104 positioned at the inlet side of housing 102 are fluidly coupled to air inlets 124 on the inlet side and to transverse air channel 110. Thus, compartment 104c has its upstream side fluidly coupled to an inlet 124 and has its downstream side coupled to branch 110L of transverse air channel 110, while fan compartment 104d has its upstream side fluidly coupled to an inlet 124 and has its downstream side fluidly coupled to branch 110R of transverse air channel 110. In some embodiments, inlet 124 can include one or more valves to control the airflow from the inlet side of module 100 into second-row compartments 104c and 104c and longitudinal air channel 108. In one embodiment, 124 can be a fully open inlet. Similarly, fan compartments 104 positioned at the outlet side of housing 102 are fluidly coupled to louvers 116 on the outlet side and to transverse air channel 110. Thus, compartment 104a has its downstream side fluidly coupled to louvers 116 and its upstream side fluidly coupled to branch 110L of transverse air channel 110, while fan compartment 104b has its downstream side fluidly coupled to louvers 116 and its upstream side fluidly coupled to branch 110R of transverse air channel 110. In an embodiment of fan module 100 with more than two rows of fan compartments, some fan compartments would have both their upstream and downstream sides fluidly coupled to transverse air channels.

Each fan compartment 104 also includes a corresponding valve 105 that can be used control the exchange of air between the fan compartment and a transverse air channel. In the illustrated embodiment, fan compartment 104a has valve 105a, fan compartment 104b has valve 105b, and so on. In some embodiments, valves 105 can be part of the design of fan compartment 104 or of the transverse channel 110. For instance, valve 105b can be considered as part of the design of either compartment 104b or transverse air channel 110R, or either part of the entire housing 102. In one embodiment valves 105 can be movable louvers that can open to allow flow or close to block flow, but in other embodiments they can be other types of valves such as movable flaps.

Controller 118 is positioned within housing 102 to control the operation of valves within module 100, thus controlling the airflow through the module. In one embodiment, controller 118 can include a processor, memory, communication interface, and other such components usually associated with controllers. Controller 118 is communicatively coupled to drive mechanisms of valves 105a-105d, 114, and 126 so that it can open and close those valves. Controller 118 is also coupled to fans 106 so that it can control their speeds and hence their head pressures and flow rates. Through its communication interface, controller 118 can also be communicatively coupled to sensors outside fan module 100 so that the controller can configure the module's airflow and provide closed-loop control. In one embodiment, for instance, controller 118 could be coupled to one or more temperature sensors within the electronics compartment to which module 100 can be attached (see, e.g., FIGS. 3A-3B). In the illustrated embodiment controller 118 is positioned within housing 102, but in other embodiments the controller could be positioned outside the housing, for instance in a compartment formed or attached to the outside of housing 102.

A set of louvers 116 can be positioned over the outlet side of housing 102 to control the flow exiting through the outlet side of module 100. In one embodiment louvers 116 can include slats that open and close, thus allowing or managing flow from all or part of the outlet side of module 100. In another embodiment, louvers 116 can include one or more vanes that change the direction of the airflow exiting from the outlet side. Embodiments of louvers 116 are further discussed below in connection with FIG. 1B.

Figure 1B:
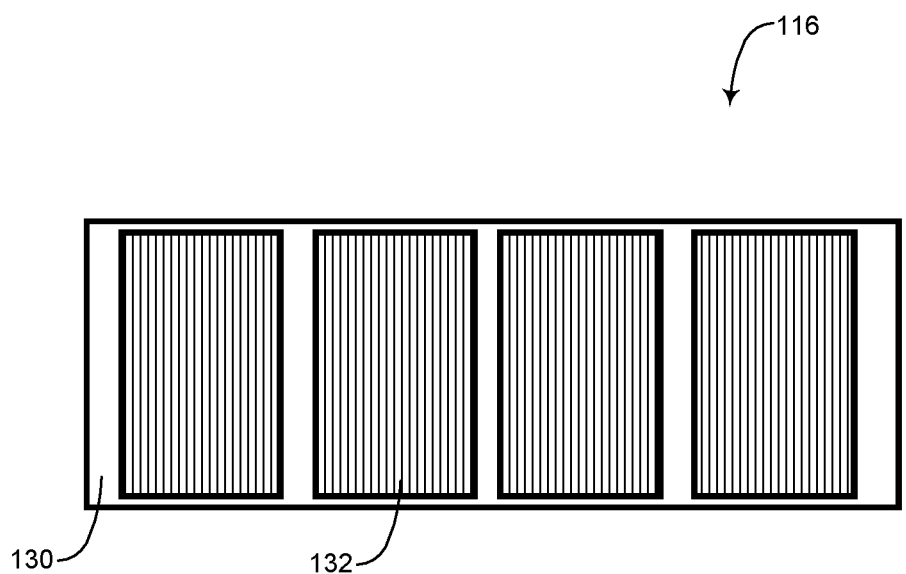
FIG. 1B is a front view of an embodiment of louvers for a fan module such as the one shown in FIG. 1A.

FIG. 1B illustrates an embodiment of a set of louvers 116 that can be used with fan module 100. Louvers 116 include a frame 130 within which are positioned one or more louver panels 132. The illustrated embodiment of louvers 116 includes four louver panels 132, but other embodiments can include more or less louver panels than shown. In some embodiments each louver panels 132 can align with a fan column in fan module 100, so that there is a one-to-one correspondence between fan columns and louver panels, but other embodiments need not have the column-to-panel alignment or the one-to-one correspondence.

Frame 130 is designed to fit over the outlet end of housing 102 and in some embodiments can include screws, bolts or other fasteners to fix the louvers to the housing. In other embodiments, frame 130 can be designed so that it engages housing 102 with an interference fit or press fit, thus fixing louver 116 to the housing. Each louver panel 132 can include slats that open and close, thus allowing or blocking flow from exiting all or part of the outlet side of module 100. In some embodiments the slats in each louver panel can have a variable opening ratio—i.e., the ratio of the area of the panel through which fluid can flow to the total area of the panel or, put differently, the ratio of the area between slats to the total panel area. In another embodiment, panels 132 can include one or more vanes that change the direction of the airflow exiting from the outlet side of fan module 100. In one embodiment all louver panels 132 are the same, but in other embodiments all louver panels 132 need not be the same.

Figure 2A:
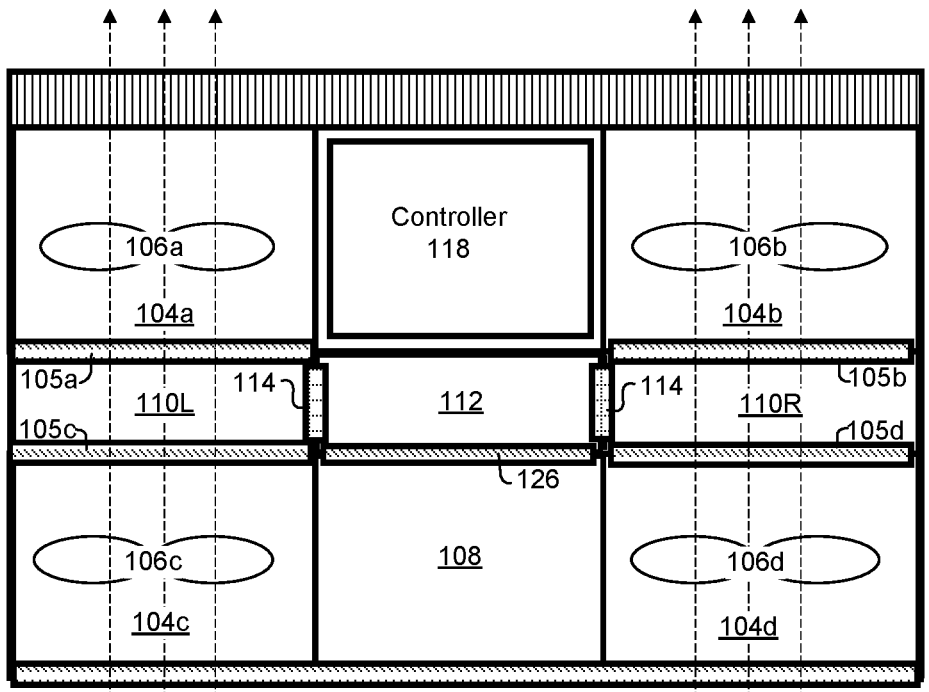
FIGS. 2A-2D are cross-sectional view of an embodiment of a fan module showing different embodiments of operating modes that can be implemented.

FIGS. 2A-2D illustrate embodiments of different modes of operation of fan module 100. FIG. 2A illustrates a first operating mode in which the fans 106 in both fan columns operate in series. In this embodiment the valves of control chamber 112 are set to prevent airflow into or out of the control chamber 112 from longitudinal air channel 108 or transverse air channel 110. Valves 105 in each of the fan compartments 104 are set to allow flow from second-row fan compartment 104c through transverse channel 110L into first-row fan compartment 104a and to allow flow from second-row fan compartment 104d through transverse channel 110R and into first-row fan compartment 104b. The result is two pairs of fans 106 operating in series to create airflow through the first and second fan columns.

Figure 2B:
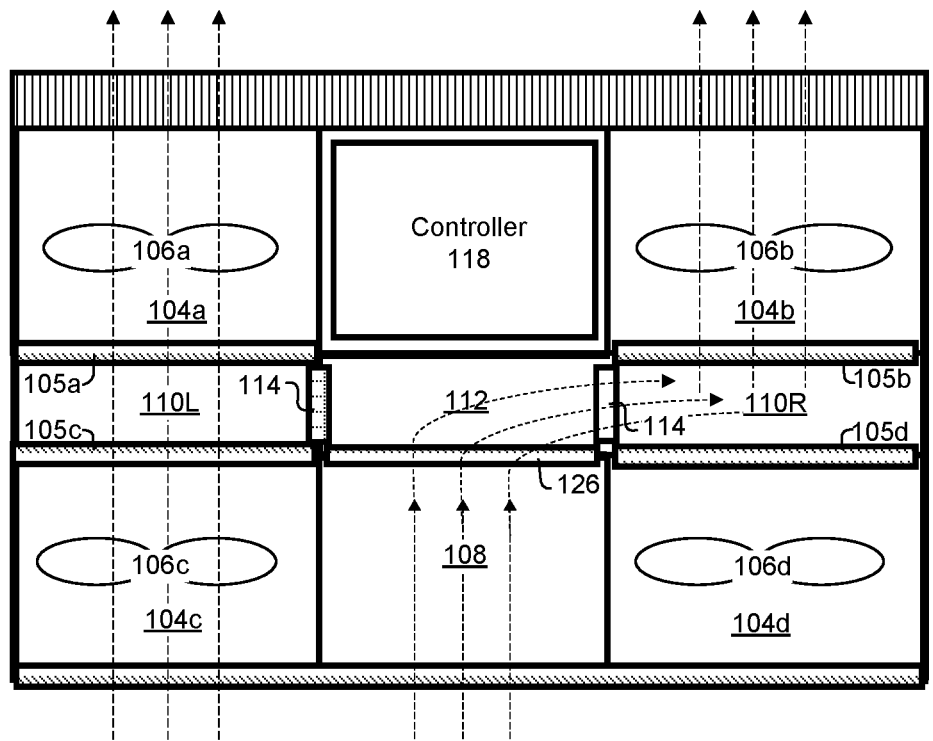

FIG. 2B illustrates a second operating mode in which the fans 106 in the first fan column operate in series while fans in the first fan row operate in parallel. In this embodiment valve 126 of control chamber 112 is set to allow airflow into control chamber 112 from longitudinal air channel 108. Valves 114 are set to allow flow from control chamber 112 into right branch 110R of transverse air channel 110 while preventing flow into left branch 110L. Valves 105 in each fan compartment 104 are set to allow flow from second-row fan compartment 104c through transverse channel 110L and into first-row fan compartment 104a, while at the same time blocking flow from second-row fan compartment 104d through transverse channel 110R and into first-row fan compartment 104b. The result is one pair of fans 106 operating in series to create airflow through the first fan column, and a single second-column fan 106b bypassing the other second-column fan 106d by drawing air through longitudinal air channel 108 and branch 110R of the transverse air channel. Put differently, this allows the fans in the first fan column to operate in series while simultaneously having the fans in the first fan row operate in parallel. This gives the system the maximum head pressure as well as flowrate.

Figure 2C:
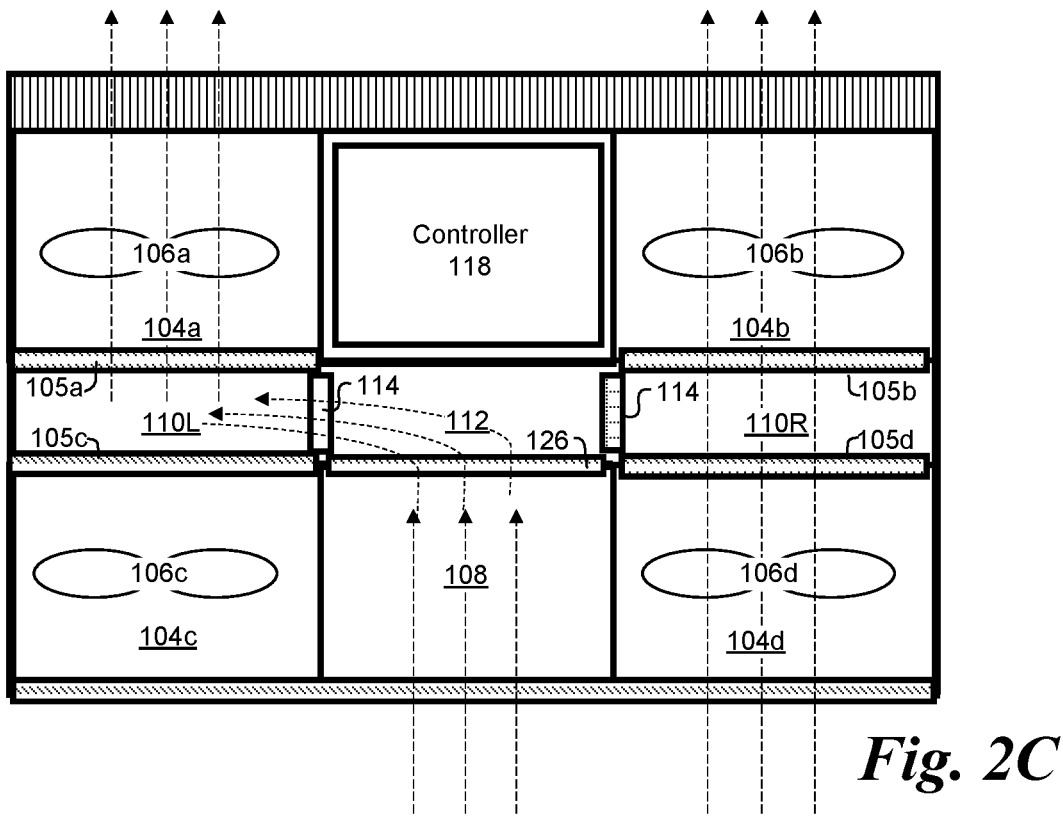

FIG. 2C illustrates a third operation mode in which the fans 106 in one fan column operate in series while fans in one fan column operate in parallel. In this embodiment valve 126 of control chamber 112 is set to allow airflow into control chamber 112 from longitudinal air channel 108. Valves 114 are set to allow flow from control chamber 112 into left branch 110L of transverse air channel 110 while preventing flow into right branch 110R. Valves 105c and 105d in fan compartments 104c and 104d are set to prevent flow from second-row fan compartment 104c through transverse air channel 110L into second row fan compartment 104a and to allow flow from second-row fan compartment 104d through transverse air channel 110R into first-row fan compartment 104b. The result is one pair of fans 106b and 106d operating in series to create airflow through the second fan column, and a single first-column fan 106a bypassing the other first-column fan 106c by drawing air through longitudinal air channel 108 and branch 110L of the transverse air channel. Put differently, this allows the fans in the first column to operate in series while simultaneously having the fans in the second row operate in parallel.

Figure 2D:
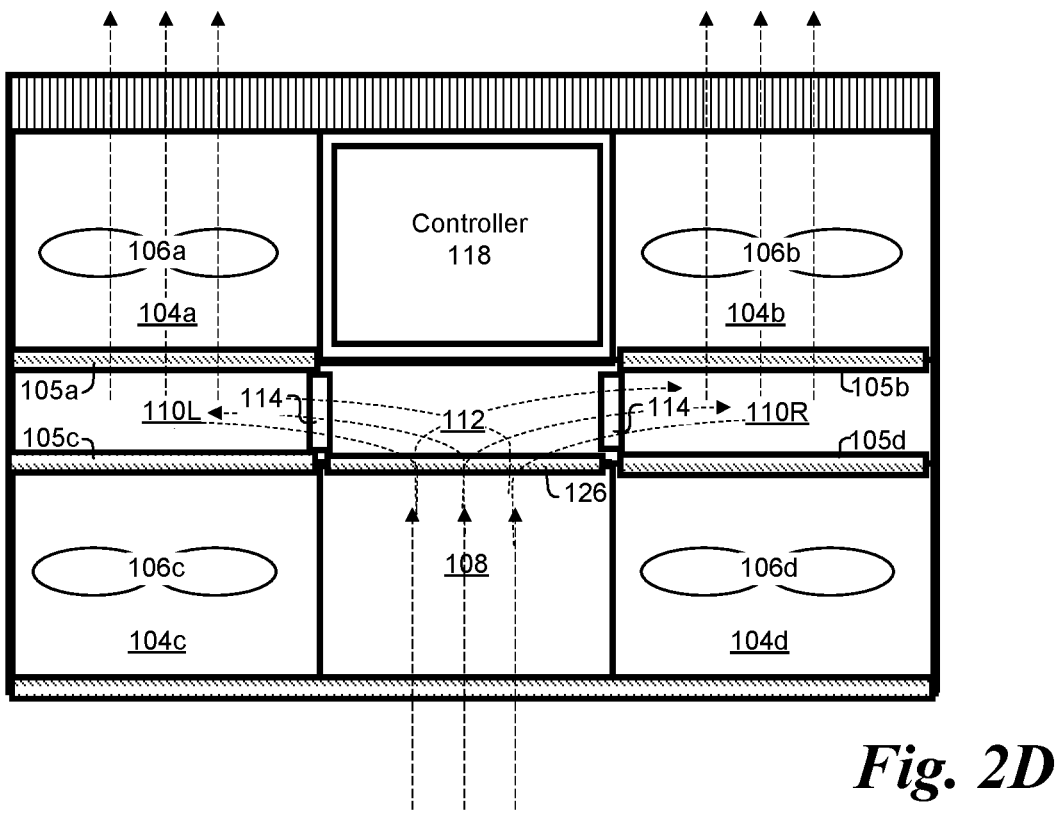

FIG. 2D illustrates a fourth operation mode in which the fans 106 in the first fan row operate in parallel. In this embodiment valve 126 of control chamber 112 is set to allow airflow into the control chamber from longitudinal air channel 108. Valves 114 are set to allow flow from control chamber 112 into left branch 110L and right branch 110R of transverse air channel 110. Valves 105c and 105d in fan compartments 104c and 104d are set to block flow from those fan compartments into transverse air channel 110, while valves 105a and 105d are set to allow flow from transverse air channel 110 into compartments 104a and 104d. Fans 106c and 106d are turned off. The result is a pair of fans 106a and 106b in the first fan row operating in parallel to create airflow by drawing air through longitudinal air channel 108 and through both branches 110L and 110R of the transverse air channel. Put differently, this fourth operation mode allows the fans in the first fan row to operate in parallel while bypassing the fans in the second fan row.

Figure 3A:
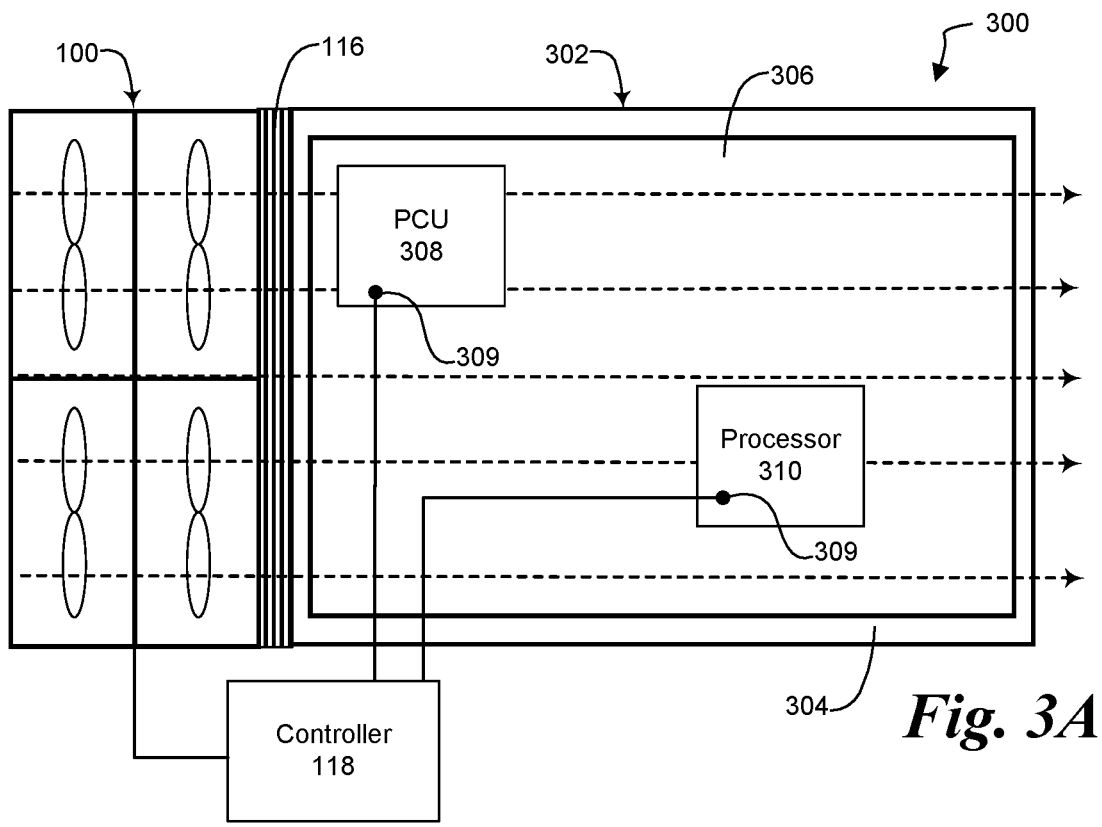
FIGS. 3A-3B are diagrams of an embodiment of an assembly including an electronics compartment coupled to a fan module.
Figure 3B:
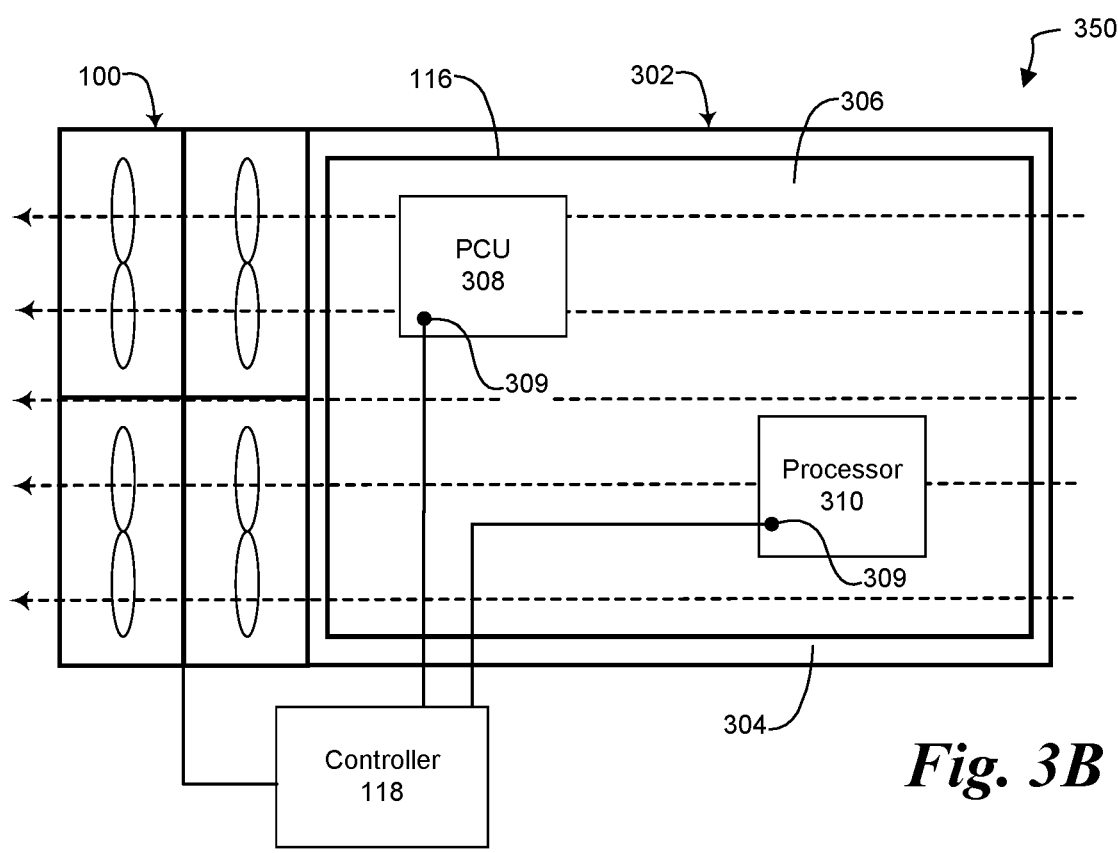

FIGS. 3A-3B illustrate embodiments of assemblies including a fan module such as fan module 100. FIG. 3A illustrates an assembly 300 in which a fan module 100 is attached to the housing 304 of an electronics compartment 302, such that it is fluidly coupled to the interior of the enclosure. Electronics compartment 302 includes a housing 304 within which there are one or more printed circuit boards (PCBs) 306. The one or more printed circuit boards can be a motherboard, blade servers or other kind of IT equipment. Heat-generating electronics such as power control unit (PCU) 308 and processor 310 can be mounted on printed circuit board 306, or otherwise present in compartment 302, along with numerous other electronic components (not shown in this figure) which can also generate heat. Fan module controller 118 can be coupled to fan module 100 and also to one or more temperature sensors 309 located in or near important heat-generating components such as PCU 308 and processor 310. The PCU may also be used for providing power for operating the cooling unit 100.

Figure 4:
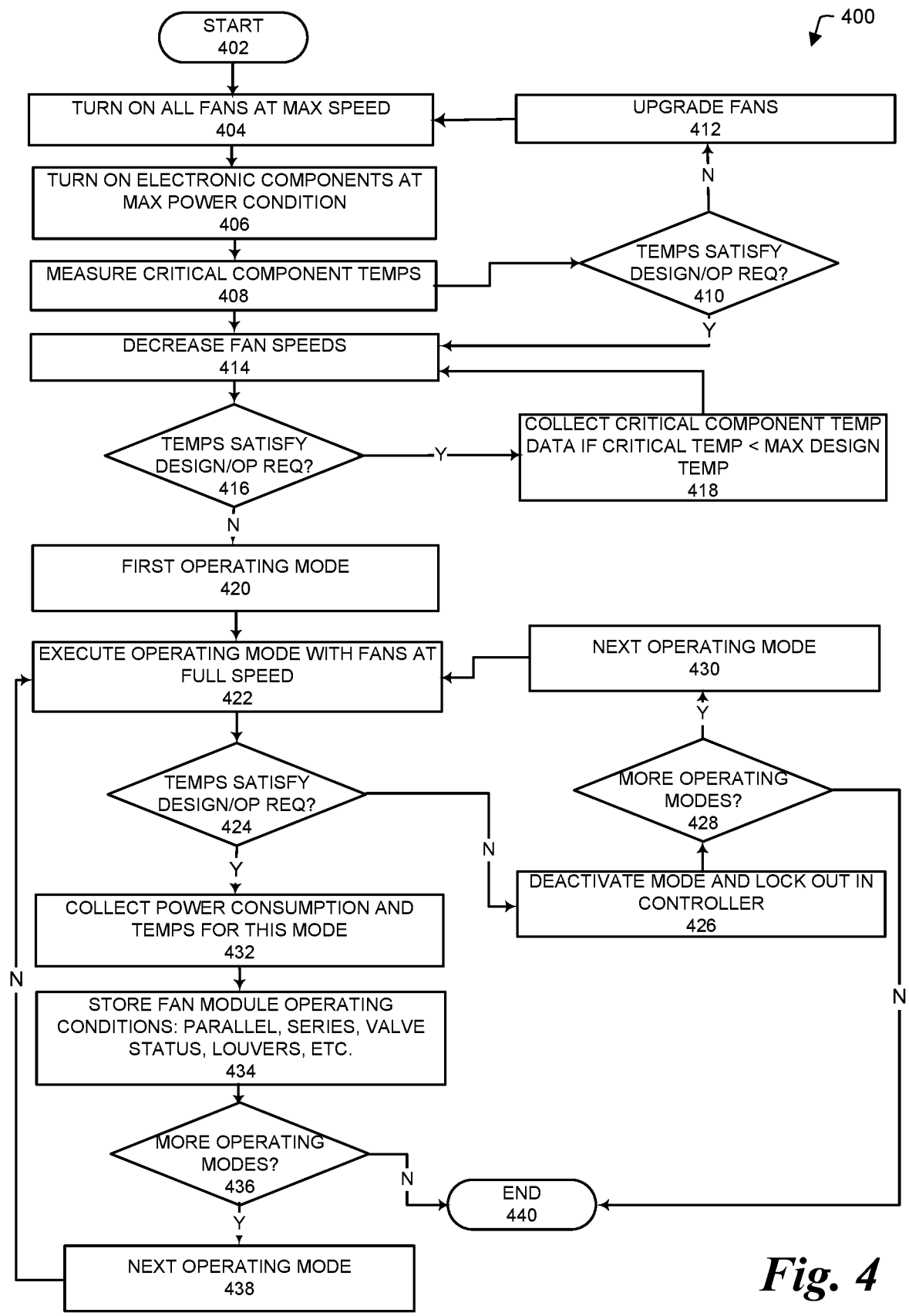
FIG. 4 is a flowchart of an embodiment of a process for adapting the operation of a fan module to the configuration of an electronics compartment to which it is attached.

In operation, fan unit 100 can first be configured for cooling the particular configuration of heat-generating components within compartment 302 by a process such as the one shown in FIG. 4. After it is configured, fan module 100 operates to blow cool air through louvers 116 into the interior of compartment 302, thus cooling the heat-generating components in the interior. During operation, controller 118 can monitor the temperatures of critical components such as PCU 308 and processor 310 and adjust fan speeds, valve settings, louver settings, etc. in fan unit 100 to keep the component temperatures within specified limits, thus providing closed-loop temperature control. Since the electronics may be packaged in many ways, some of them may result in significant non-uniform airflow resistance on the same PCB.

FIG. 3B illustrates another embodiment of an assembly 350 including a fan module such as fan module 100. Assembly 350 is in most respects similar to assembly 300. The primary difference between assemblies 300 and 350 is the flow direction: in assembly 300 fan module 100 pushes cool air into the interior of compartment 302. But in assembly 350, the flow direction is reversed so that fan module 100 cools the heat-generating components within compartment 302 by drawing hot air out of the enclosure. To accomplish this, in assembly 350 fan module 100 can simply be turned around and mounted onto housing 304 with its inlet end attached to housing 304 so that the fan module is fluidly coupled to the interior of the compartment. In assembly 350 louvers 116 can be omitted.

FIG. 4 illustrates an embodiment of a process 400 for configuring a fan module 100 to cool heat-generating components within a compartment in an assembly such as the ones shown in FIGS. 3A-3B. The process starts at block 402.

Blocks 404-412 are designed to test at the outset whether the fan module is capable of providing acceptable cooling to the electronics when they operate at maximum power and hence emit maximum heat. At block 404, the process turns on all fans at their maximum speed and at block 406 the process turns on the heat-generating electronic components at their maximum power. At block 408 the process measures the temperatures of critical components, such as a processor, and at block 410 the process checks whether the measured temperatures satisfy design and/or operational requirements. If at block 410 the process determines that the measured temperatures do not satisfy design and/or operational requirements, meaning that fan unit 100 lacks the capacity needed for peak-power cooling, then the process moves to block 412 (this can be understood the cooling unit does not satisfy the capacity requirement), where the fans within the fan unit are upgraded to improve head pressure and flow rate, and the process is tried again. But if at block 410 the process determines that the measured temperatures do satisfy design and/or operational requirements, the process moves on to block 414.

At block 414, the process begins reducing the fan speeds. At block 416 the process checks whether the measured component temperatures satisfy design and/or operational requirements. If at block 416 the process determines that the measured temperatures satisfy design and/or operational requirements, then the process moves to block 418 where it collects component temperature data as long as the measured temperatures are below the maximum design temperatures. The process then returns to block 414, where it continues reducing the fan speeds, and then to block 416 again to determine whether the measured temperatures satisfy design and/or operational requirements. If at block 416 the process determines that the measured temperatures do not satisfy design and/or operational requirements, then the process has identified the minimum fan speed and moves on to block 420.

At block 420, the process selects the first operating mode of fan module 100 (see, e.g., FIGS. 2A-2D). At block 422 the process operates or executes the selected mode with the fans running at full speed; this step finds the flow resistance of the component configuration within compartment 302. At block 424 the process checks whether the measured temperatures satisfy design and/or operational requirements. If at block 424 the process determines that the temperatures measured for the operating mode do not satisfy design and/or operational requirements, then this operating mode does not provide adequate cooling and at block 426 the process deactivates the operating mode and locks out the operating mode in the controller. At block 428 the process checks whether there are more operating modes to test. If at block 428 there are more operating modes, the process goes to block 430, where it selects the next operating mode, and then returns to block 422. But if at block 428 there are no further operating modes, the process ends at block 440.

If at block 424 the process determines that the temperatures measured for the operating mode do satisfy design and/or operational requirements, the process moves to block 432, where it collects power consumption and temperature data for the current mode. Next, at block 343 the process stores the fan module configuration information for the current operating mode; stored information can include whether fans are running in series or parallel, status and positions of valves, positions of louvers if present, and so on. Also at block 432, or at block 434, or between blocks 432 and 434, different fan speeds can be adjusted in an operating mode to optimize the power.

At block 436 the process chance whether there are more operating modes to test. If at block 436 there are more operating modes to test, the process goes to block 438, where it selects the next operating mode to be testes, and then returns to block 422. But if at block 436 there are no more operating modes to test, the process ends at block 440. Having gone through process 400 to configure the fan module 100, the fan module can then begin normal operation using any of the modes whose information was stored at block 434.

Other embodiments are possible besides the ones described above. For instance:

The fan system or fan matrix can be arranged in different ways.

The fan system can also be arranged in multiple sub-modules, such as combing two systems into one system.

The internal airflow path can be modified based on different design, similar results or adjusting airflow paths.

The above description of embodiments is not intended to be exhaustive or to limit the invention to the described forms. Specific embodiments of, and examples for, the invention are described herein for illustrative purposes, but various modifications are possible.

What is claimed is:

1. A fan module, comprising:
a module housing having a module inlet and a module outlet;
a fan compartment matrix positioned within the module housing to move air between the module inlet and the module outlet, the fan compartment matrix including:
an M×N matrix of fan compartments, M being a number of fan rows and N being a number of fan columns, each fan compartment having an upstream side, a downstream side, and valves to control an airflow through the upstream side, the downstream side, or both the upstream side and the downstream side;
a longitudinal air channel positioned between each pair of the fan columns;
a transverse air channel positioned between each pair of the fan rows, the transverse air channel being fluidly coupled to the fan compartments between which it is positioned; and
a control chamber positioned at each confluence of the longitudinal air channel and the transverse air channel, the control chamber including one or more valves to control an airflow between the longitudinal air channel and the transverse air channel; and
a fan positioned in each fan compartment.

2. The fan module of claim 1, further comprising a set of one or more louvers positioned over the module outlet, wherein the louvers can control a direction, a flow rate, or both the direction and flow rate, of air exiting through the module outlet.

3. The fan module of claim 1, wherein each control chamber is configurable to:

bypass its corresponding transverse channel, and
direct airflow through its corresponding longitudinal air channel or block airflow through its corresponding longitudinal air channel.

4. The fan module of claim 1, wherein each control chamber is configurable to:
allow longitudinal airflow in an upstream part of the corresponding longitudinal air channel while blocking airflow into a downstream part of the corresponding longitudinal air channel, and
direct airflow from the upstream part of the corresponding longitudinal air channel into the corresponding transverse air channel in both transverse directions.

5. The fan module of claim 1, wherein each control chamber is configurable to:
allow longitudinal airflow in an upstream part of the corresponding longitudinal air channel while blocking airflow into a downstream part of the corresponding longitudinal air channel, and
direct airflow from the upstream part of the corresponding longitudinal air channel in only one transverse direction into the corresponding transverse air channel.

6. The fan module of claim 1, wherein each compartment has its upstream side fluidly coupled to the module inlet or to the transverse air channel and has its downstream side fluidly coupled to the module outlet or to the transverse air channel.

7. The fan module of claim 1, wherein there are multiple transverse air channels and each fan compartment has its upstream side and its downstream side fluidly coupled to separate ones of the multiple transverse air channels.

8. The fan module of claim 6, further comprising a controller communicatively coupled to the one or more valves of the control chamber and to one or more valves of each fan compartment.

9. A system, comprising:
a compartment having therein at least one heat-generating electronic component;
a fan module fluidly coupled to an interior of the compartment, the fan module comprising:
a module housing having a module inlet and a module outlet;
a fan compartment matrix positioned within the module housing to move air between the module inlet and the module outlet, the fan compartment matrix including:
an M×N matrix of fan compartments, M being a number of fan rows and N being a number of fan columns, each fan compartment having an upstream side, a downstream side, and valves to control an airflow through the upstream side, the downstream side, or both the upstream side and the downstream side;
a longitudinal air channel positioned between each pair of the fan columns;
a transverse air channel positioned between each pair of the fan rows, the transverse air channel being fluidly coupled to the fan compartments between which it is positioned; and
a control chamber positioned at each confluence of the longitudinal air channel and the transverse air channel, the control chamber including one or more valves to control an airflow between the longitudinal air channel and the transverse air channel; and
a fan positioned in each fan compartment.

10. The system of claim 9, further comprising a set of one or more louvers positioned over the module outlet, wherein the louvers can control a direction, a flow rate, or both the direction and flow rate, of air exiting through the module outlet.

11. The system of claim 9, wherein each control chamber is configurable to:
bypass its corresponding transverse channel, and
direct airflow through its corresponding longitudinal air channel or block airflow through its corresponding longitudinal air channel.

12. The system of claim 9, wherein each control chamber is configurable to:
allow longitudinal airflow in an upstream part of the corresponding longitudinal air channel while blocking airflow into a downstream part of the corresponding longitudinal air channel, and
direct airflow from the upstream part of the corresponding longitudinal air channel into the corresponding transverse air channel in both transverse directions.

13. The system of claim 9, wherein each control chamber is configurable to:
allow longitudinal airflow in an upstream part of the corresponding longitudinal air channel while blocking airflow into a downstream part of the corresponding longitudinal air channel, and
direct airflow from the upstream part of the corresponding longitudinal air channel in only one transverse direction into the corresponding transverse air channel.

14. The system of claim 9, wherein each fan compartment has its upstream side fluidly coupled to the module inlet or to the transverse air channel and has its downstream side fluidly coupled to the module outlet or to the transverse air channel.

15. The system of claim 9, wherein there are multiple transverse air channels and each fan compartment has its upstream side and its downstream side fluidly coupled to separate ones of the multiple transverse air channels.

16. The system of claim 9, further comprising a controller communicatively coupled to the one or more valves of the control chamber, to one or more valves of each fan compartment, and to at least one temperature sensor thermally coupled to a heat-generating component.

17. A process, comprising:
coupling a fan module to a compartment having therein one or more heat-generating electronic component, the fan module comprising:
a module housing having a module inlet and a module outlet,
a fan compartment matrix positioned within the module housing to move air between the module inlet and the module outlet, the fan compartment matrix including:
an M×N matrix of fan compartments, M being a number of fan rows and N being a number of fan columns, each fan compartment having an upstream side, a downstream side, and valves to control an airflow through the upstream side, the downstream side, or both the upstream side and the downstream side,
a longitudinal air channel positioned between each pair of the fan columns,
a transverse air channel positioned between each pair of the fan rows, the transverse air channel being fluidly coupled to the fan compartments between which it is positioned, and a control chamber positioned at each confluence of the longitudinal air channel and the transverse air channel, the control chamber including one or more valves to control an airflow between the longitudinal air channel and the transverse air channel, and a fan positioned in each fan compartment;

adapting the fan module to cool the one or more heat-generating components within the compartment.

18. The process of claim 17, wherein the fan module has multiple operating modes and wherein adapting the fan module to cool the one or more heat-generating components comprises:

operating the heat generating components at maximum power;

running the fan module in each of the multiple operating modes, determining whether the operating mode keeps the heat-generating components below their maximum temperature, and adjusting a fan speed to optimize a power consumption, recording successful operating modes, the successful operating modes being the ones that keep the heat-generating components below their maximum temperature; and operating the fan module during a normal operation of the heat generating components using one or more of the successful operating modes.

* * * * *